United States Patent [19]

Herzig

[11] Patent Number: 5,016,847
[45] Date of Patent: May 21, 1991

[54] OBJECT RETAINING APPARATUS FOR A VEHICLE

[76] Inventor: Paul A. Herzig, 11059 Alscot La., Whitehouse, Ohio 43571

[21] Appl. No.: 523,760

[22] Filed: May 15, 1990

[51] Int. Cl.$^5$ .............................................. A47F 7/00
[52] U.S. Cl. .................................. 248/175; 248/153; 211/181; 224/42.42 R
[58] Field of Search ................ 248/175, 153; 211/181, 211/60.1, 62; 224/915, 42.42

[56] References Cited

U.S. PATENT DOCUMENTS

| | | | |
|---|---|---|---|
| 759,006 | 5/1904 | Nevius | 211/181 Y |
| 3,357,614 | 12/1967 | Berg | 224/42.42 R Y |
| 3,458,095 | 7/1969 | Stall | 224/42.42 R |
| 4,776,470 | 10/1988 | Chap | 211/181 Y |

FOREIGN PATENT DOCUMENTS 817019  7/1959  United Kingdom ................ 211/181

Primary Examiner—Alvin C. Chin-Shue
Attorney, Agent, or Firm—Marshall & Melhorn

[57] ABSTRACT

An apparatus for supporting an object includes a member having a plurality of connected bent portions. The portions include pair of generally horizontally extending, spaced apart, generally parallel lower legs each having a free end and an opposite end connected a lower end of one of a pair of vertically extending first uprights each connected at an upper end to a generally horizontally extending first cross beam. A pair of generally horizontally extending arms are each connected at one end to one of the first uprights between the upper and lower ends and at an opposite end to a lower end of one of a pair of generally vertically extending second uprights each connected at an upper end to a generally horizontally extending second cross beam. A pair of upper legs each have one end connected to one of the first uprights and extend generally horizontally parallel to and spaced above the lower legs a distance generally corresponding to a thickness of carpet in a vehicle. In one embodiment, a first formed member has the lower legs, the first uprights and the first cross beam forming portions thereof, and a second formed member has the arms, the second uprights and the second cross beam forming portions thereof. In another embodiment, the apparatus is formed from a single bent wire.

12 Claims, 1 Drawing Sheet 5,016,847

OBJECT RETAINING APPARATUS FOR A VEHICLE

BACKGROUND OF THE INVENTION

The present invention relates generally to an apparatus for retaining objects and, in particular, to an apparatus attached to the interior of a vehicle for holding objects such as a collapsible umbrella.

Formed wire racks and stands for holding umbrellas and parasols are well known as shown in U.S. Pat. Nos. 288,616 and 492,359. Also, there are many devices available which attach to a vehicle for retaining an umbrella. U.S. Pat. No. 309,841 discloses an umbrella holder attached to the outside of a Hansom cab and formed as an upper ring and a lower cup. A bracket mounted between the trim molding and the headliner and having a pair of cradle type hooks for holding an umbrella is shown in U.S. Pat. No. 4,375,268. U.S. Pat. No. 4,378,888 discloses an umbrella support having a trough member for receiving a folded umbrella, the trough member being connected to a mounting plate for fastening to the interior of the vehicle and including a drain tube adapted to extend through the interior surface of a vehicle door. U.S. Pat. No 2,969,900 discloses a wire support with a frame which spans the drive shaft hump in a vehicle. Clips for holding objects are attached to the upper face of the frame.

SUMMARY OF THE INVENTION

The present invention concerns an apparatus for retaining an elongated object such as a collapsible umbrella, a flashlight, or an ice scraper. The apparatus can be conveniently attached to the carpeting in a vehicle, for example, adjacent the forward edge of the front seat on the floor. It is designed to be placed as close to the seat as possible without interfering with the seat adjustment, yet easily accessible by the driver or a front seat passenger. A pair of spaced apart legs are provided to permit the apparatus to straddle the hump formed by the drive shaft tunnel, if necessary.

The apparatus includes a formed wire member for supporting an object, the member having a plurality of connected bent portions. A pair of generally horizontally extending, spaced apart, generally parallel lower legs each having a free end and an opposite end are connected to a pair of vertically extending first uprights, each the first uprights being connected at a lower end to the opposite end of one of said lower legs. A generally horizontally extending first cross beam is connected at opposite ends to upper ends of the first uprights and a pair of generally horizontally extending arms are each connected at one end to one of the first uprights between the upper and lower ends, the arms extending generally in the same direction as the lower legs and having opposite ends. A pair of generally vertically extending second uprights are each connected at a lower end to one of the opposite ends of the arms and a generally horizontally extending second cross beam is connected at opposite ends to upper ends of the second uprights. A pair of upper legs each have one end connected to one of the first uprights and extend generally horizontally parallel to and spaced above the lower legs. The upper legs are spaced from the lower legs a distance generally corresponding to a thickness of carpet in a vehicle.

In one embodiment, two formed wire members are provided, a first one of the members having the lower legs, the first uprights and the first cross beam forming portions thereof, and a second one of the members having the arms, the second uprights and the second cross beam forming portions thereof. The second member further includes a pair of third uprights each connected to the one end of one of the arms. In another embodiment, the apparatus is formed from a single bent wire.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
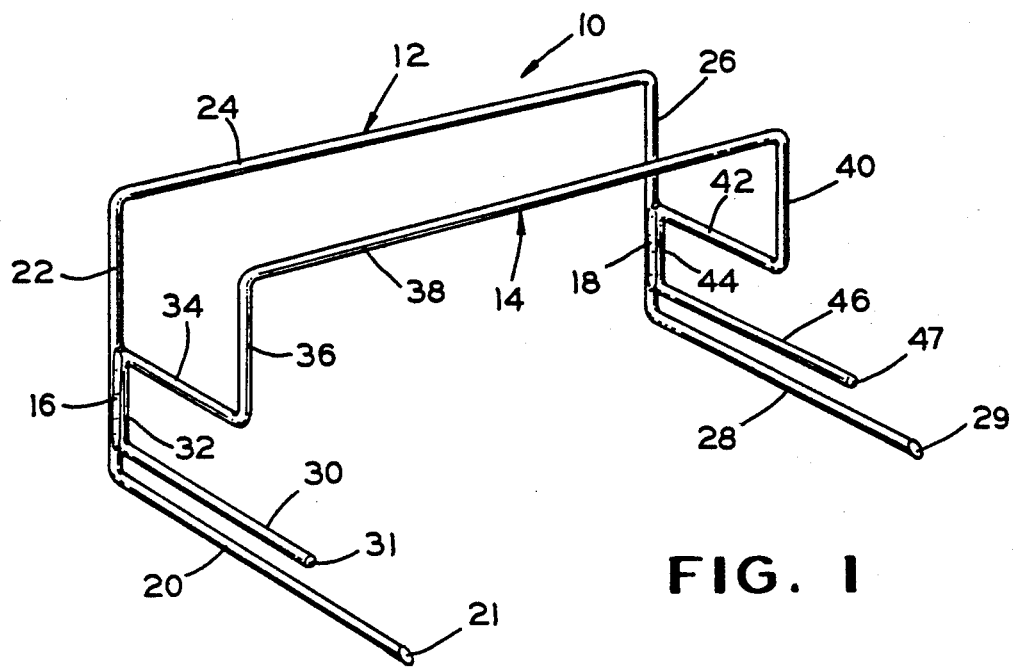
FIG. 1 is a perspective view of an object retaining apparatus in accordance with the present invention.

As shown in FIG. 1, an object retaining apparatus 10, in accordance with the present invention, has a pair of members 12 and 14 connected together by suitable means 16 and 18 such as by welding. The member 12 can be formed of wire and is bent into a plurality of sections or portions which include, at one end thereof, a generally horizontally extending base or lower leg 20 having a free end 21 and being connected at an opposite end to a bottom end of a generally vertically upwardly extending upright portion 22. The upright 22 is connected at an upper end to a left end of a generally horizontally extending cross beam portion 24. The cross beam 24 extends at approximately a right angle to the longitudinal axis of the base leg 20. The beam 24 is connected at a right end to an upper end of a generally vertically downwardly extending upright portion 26. A lower end of the upright portion 26 is connected to one end of a generally horizontally extending base or lower leg 28 having an opposite free end 29.

The member 14 also can be a wire bent into a plurality of sections or portions including a generally horizontally extending upper leg 30 positioned above and generally parallel to the lower leg 20. The leg 30 has a free end 31 and is connected at an opposite end to a lower end of a generally vertically upwardly extending upright portion 32. The upright 32 is attached to the upright 22 by the weld 16. An upper end of the upright 32 is connected to one end of a generally horizontally extending arm 34. The arm 34 extends in the same direction as the legs 20 and 30 and is connected at an opposite end to a lower end of a generally vertically upwardly extending upright 36. An upper end of the upright 36 is connected to a left end of a generally horizontally extending cross beam 38 which has a right end connected to an upper end of a generally vertically downwardly extending upright 40. The cross beam 38 extends generally parallel to the cross beam 24.

A lower end of the upright 40 is connected to one end of a generally horizontally extending arm 42. An opposite end of the arm 42 is positioned adjacent to the upright 26 and is connected to an upper end of a generally vertically downwardly extending upright 44. The upright 44 is attached to the upright 26 by the weld 18 and has a lower end which is connected to one end of a generally horizontally extending upper leg 46. The leg 46 extends in the same plane as the leg 30 and terminates in a free end 47.

The apparatus 10 includes a pair of generally horizontally extending, spaced apart, generally parallel lower legs 20 and 28 each having a free end and an opposite end, a pair of vertically extending first uprights 22 and 26, each of the first uprights being connected at a lower end to the opposite end of one of the lower legs, a generally horizontally extending first cross beam 24 connected at opposite ends to upper ends of the first uprights, a pair of generally horizontally extending arms 34 and 42 each connected at one end to one of the first uprights between the upper and lower ends, the arms extending generally in the same direction as the lower legs and having opposite ends, a pair of generally vertically extending second uprights 36 and 40 each connected at a lower end to one of the opposite ends of the arms, and a generally horizontally extending second cross beam 38 connecting at opposite ends to upper ends of the second uprights. The apparatus 10 also includes a pair of upper legs 30 and 46 each having one end connected to one of the first uprights and extending generally horizontally parallel to and spaced above the lower legs and a pair of third uprights 32 and 44 each connected to the one end of one of the arms.

Figure 2:
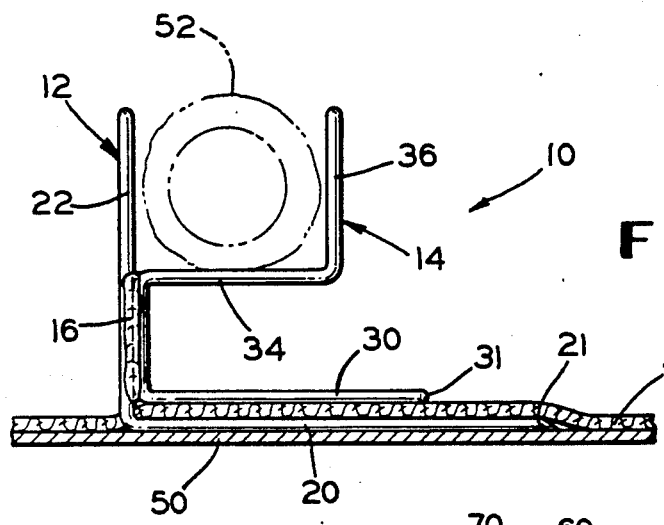
FIG. 2 is left side view of the apparatus shown in FIG. 1 installed in a vehicle.

As shown in FIG. 2, the apparatus 10 is installed in its operable position by inserting the lower legs 20 and 28 (not shown) through a floor covering or carpet 48 in a vehicle. The free ends 21 and 29 can be tapered or pointed for use in piercing the carpet 48 and inserting the legs 20 and 28 under the carpet to be supported by a floor 50 of the vehicle. The spacing between the lower leg 20 and the upper leg 30, and between the lower leg 28 and the upper leg 46 is sufficient to accept the thickness of the carpet 48. Thus, the legs 20 and 30 provide a base of support and clamp on opposite sides of the carpet 48 to provide additional stability. The legs 28 and 46 function in the same manner. The free ends 31 and 47 can be rounded or blunted to avoid damage to the carpet 48 and prevent injury to a user.

The apparatus 10 supports and retains objects, especially elongated objects such as an umbrella 52 or a flashlight. The members 12 and 14 are formed of a strong yet flexible material which returns to the shape shown after deflection. As shown in FIG. 2, a folding or collapsible umbrella 52 is received between the uprights 22 and 36 and rests upon the arm 34. The horizontal spacing between the uprights 22 and 36 can be selected to accommodate the typical umbrella and flashlight, and can be selected to clamp against such an object since the uprights can be spread apart and will return to the position shown.

Figure 3:
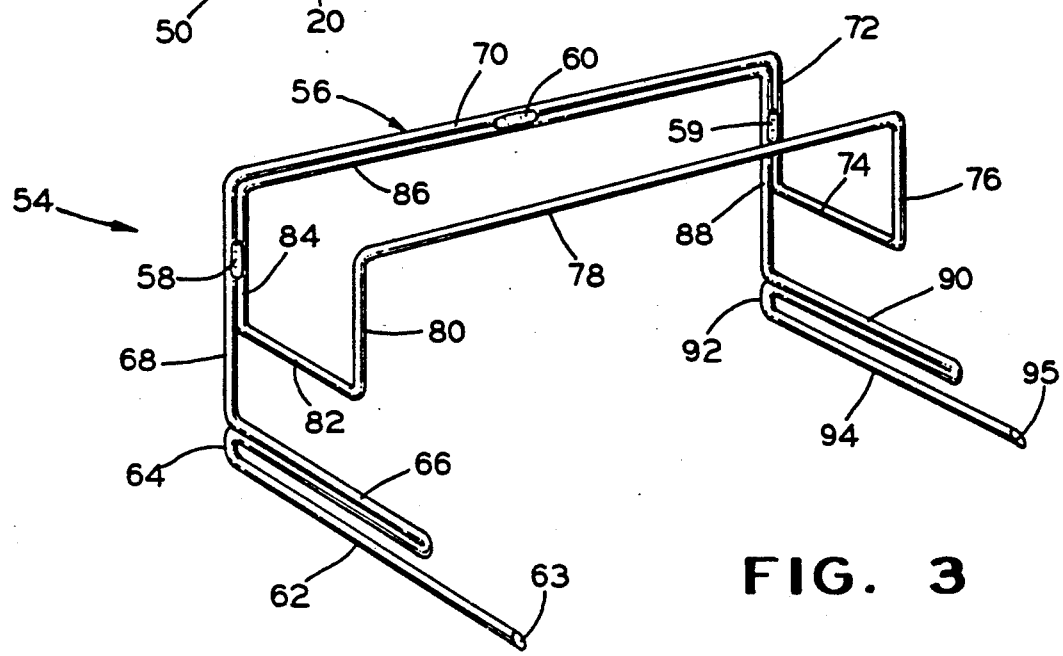
FIG. 3 is a perspective view of an alternate embodiment of the apparatus shown in FIG. 1.

An alternate embodiment of the object retaining apparatus, in accordance with the present invention, is shown in FIG. 3. An object retaining apparatus 54 is formed of a single wire member 56 bent in the same general shape as the apparatus 10 with portions secured together by welds 58, 59 and 60. The member 56 has at one end a generally horizontally extending base or lower leg 62 with a free end 63 and an opposite end connected to a generally U-shaped portion 64. The U-shaped portion 64 is connected to an upper leg 66 which extends generally parallel to the lower leg 62 and doubles back on itself to a connection at a lower end of a generally vertically upwardly extending upright portion 68. An upper end of the upright 68 is connected to a left end of a generally horizontally extending cross beam 70 having a right end connected to an upper end of a generally vertically downwardly extending upright 72.

A lower end of the upright 72 is connected to one end of a generally horizontally extending arm 74. An opposite end of the arm 74 is connected to a lower end of a generally vertically upwardly extending upright 76 having an upper end connected to a right end of a cross beam 78. A left end of the beam 78 is connected to an upper end of a generally vertically downwardly extending upright 80 having a lower end connected to one end of a generally horizontally extending arm 82. An opposite end of the arm 82 is connected to a lower end of a generally vertically upwardly extending upright 84 having an upper end connected to a left end of a generally horizontally extending cross beam 86. The beam 86 is connected at a right end to an upper end of a generally vertically downwardly extending upright 88. The upright 88 has a lower end connected to one end of a generally horizontally extending upper leg 90 which turns back on itself and is connected to a generally U-shaped portion 92. The portion 92 is also connected to one end of a generally horizontally extending lower leg 94 having an opposite free end 95.

The apparatus 54 supports and retains objects, especially elongated objects such as the umbrella 52, shown in FIG. 2, or a flashlight. The member 56 is formed of a strong yet flexible material which returns to the shape shown after deflection. The umbrella 52 can be received between the uprights 72 and 76 and the uprights 80 and 84 and rest upon the arms 74 and 82. The horizontal spacing between the uprights can be selected to accommodate the typical umbrella and flashlight, and can be selected to clamp against such an object since the uprights can be spread apart and will return to the position shown. In order to provide additional stability, the uprights 68 and 84 are attached by the weld 58, the cross beams 70 and 86 are attached by the weld 60, and the uprights 72 and 88 are attached by the weld 59.

In a manner similar to the apparatus 10 shown in FIG. 2, the apparatus 54 is installed in its operable position by inserting the lower legs 62 and 94 through the floor covering or carpet 48 in a vehicle The free ends 63 and 95 can be tapered or pointed for use in piercing the carpet 48 and inserting the legs 62 and 94 under the carpet to be supported by the floor 50 of the vehicle. The spacing between the lower legs 62 and 94 and the upper legs 66 and 90 respectively is sufficient to accept the thickness of the carpet 48. Thus, the legs 62, 66, 94 and 90 provide a base of support and clamp on opposite sides of the carpet 48 to provide additional stability. The ends of the arms 66 and 90 are rounded to avoid damage to the carpet 48 and prevent injury to a user.

The apparatus 10 and the apparatus 54 can be formed of a strong metal wire material which is resilient to the forcing apart of the spaced apart uprights as an object is inserted or removed. The metal can be coated with any one of numerous decorative and/or protective finishes. Various plastics are also suitable substitute materials for the wire with an adhesive replacing the welds in the apparatus 10, or combining the uprights 32 and 44 with the uprights 22 and 26 respectively. A preferable size for the apparatus is between ten and fourteen inches in width, the distance between opposite ends of the cross beams, which is suitable for retaining collapsible umbrellas, flashlights, ice scrapers, etc. As stated above, the apparatus can be conveniently attached to the carpeting in a vehicle, for example, adjacent the forward edge of the front seat on the floor. The apparatus is designed to be placed as close to the seat as possible without interfering with the seat adjustment, yet easily accessible by the driver or a front seat passenger. The legs are spaced apart to permit the apparatus to straddle the hump formed by the drive shaft tunnel, if necessary.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus including a formed member for supporting an object comprising:
   a pair of generally horizontally extending, spaced apart, generally parallel lower legs each having a free end and an opposite end;
   a pair of vertically extending first uprights, each said first upright connected at a lower end to said opposite end of one of said lower legs;
   a generally horizontally extending first cross beam connected at opposite ends to upper ends of said first uprights;
   a pair of generally horizontally extending arms each connected at one end to one of said first uprights between said upper and lower ends, said arms extending generally in the same direction as said lower legs and having opposite ends;
   a pair of generally vertically extending second uprights each connected at a lower end to one of said opposite ends of said arms;
   a generally horizontally extending second cross beam connecting at opposite ends to upper ends of said second uprights; and
   a pair of upper legs each having one end connected to one of said first uprights and a free end and extending generally horizontally parallel to and spaced above an adjacent one of said lower legs from said one first upright toward said free end of said adjacent lower leg whereby said second uprights are spaced from said first uprights a distance for receiving an object to be retained between said first and second uprights with the object resting upon said arms.

2. The apparatus according to claim 1 wherein said upper legs are spaced from said lower legs a distance generally corresponding to a thickness of carpet in a vehicle.

3. The apparatus according to claim 1 wherein said free ends of said lower legs are tapered for insertion through a carpet in a vehicle.

4. The apparatus according to claim 1 wherein said formed member includes two formed wire members, a first one of said members having said lower legs, said first uprights and said first cross beam forming portions thereof, and a second one of said members having said arms, said second uprights and said second cross beam forming portions thereof, said second member further including a pair of third uprights each connected to said one end of one of said arms.

5. The apparatus according to claim 4 including welds attaching said third uprights to said first uprights.

6. The apparatus according to claim 1 including a pair of generally vertically extending third uprights and a generally horizontally extending third cross beam, and wherein the member is formed as a continuous wire with one of said lower legs being connected to one of said first uprights being connected to said first cross beam being connected to one of said third uprights being connected to one of said arms being connected to one of said second uprights being connected to said second cross beam being connected to the other one of said second uprights being connected to the other one of said arms being connected to the other one of said third uprights being connected to said third cross beam being connected to the other one of said first uprights being connected to the other one of said lower legs.

7. The apparatus according to claim 6 including welds attaching said one first upright to said other third upright, said first cross beam to said third cross beam, and said other first upright to said one third upright.

8. The apparatus according to claim 6 including a pair of upper legs each having one end connected to one of said first uprights and extending generally horizontally parallel to and spaced above said lower legs.

9. The apparatus according to claim 6 including a pair of upper legs extending generally horizontally parallel to and spaced above said lower legs and a pair of U-shaped portions, one of said upper legs and one of said U-shaped portions being connected between each of said lower legs and said first uprights.

10. An apparatus including a formed member for supporting an object comprising:
    a pair of generally horizontally extending, spaced apart, generally parallel lower legs each having a free end and an opposite end;
    a pair of vertically extending first uprights, each said first upright connected at a lower end to said opposite end of one of said lower legs;
    a generally horizontally extending first cross beam connected at opposite ends to upper ends of said first uprights;
    a pair of generally horizontally extending arms each connected at one end to one of said first uprights between said upper and lower ends, said arms extending generally in the same direction as said lower legs and having opposite ends;
    a pair of generally vertically extending second uprights each connected at a lower end to one of said opposite ends of said arms;
    a generally horizontally extending second cross beam connecting at opposite ends to upper ends of said second uprights; and
    a pair of upper legs each having one end connected to one of said first uprights and extending generally horizontally parallel to and spaced above said lower legs, said upper legs being spaced from said lower legs a distance generally corresponding to a thickness of carpet in a vehicle wherein said formed member includes two formed wire members, a first one of said members having said lower legs, said first uprights and said first cross beam forming portions thereof, and a second one of said members having said upper legs, said arms, said second uprights and said second cross beam forming portions thereof, said second member further including a pair of third uprights each connected between one of said upper legs and said one end of one of said arms.

11. An apparatus including a formed member for supporting an object comprising:
    a pair of generally horizontally extending, spaced apart, generally parallel lower legs each having a free end adapted to be inserted through a carpet and an opposite end;

a pair of vertically extending first uprights, each said first upright connected at a lower end to said opposite end of one of said lower legs;

a generally horizontally extending first cross beam connected at opposite ends to upper ends of said first uprights;

a pair of generally horizontally extending arms each connected at one end to one of said first uprights between said upper and lower ends, said arms extending generally in the same direction as said lower legs and having opposite ends;

a pair of generally vertically extending second uprights each connected at a lower end to one of said opposite ends of said arms; and a generally horizontally extending second cross beam connecting at opposite ends to upper ends of said second uprights; and a pair of upper legs each having one end connected to one of said first uprights and a free end and extending generally horizontally parallel to and spaced above said lower legs a distance generally corresponding to a thickness of carpet in a vehicle.

12. The apparatus according to claim 11 wherein said free ends of said upper legs are rounded.

* * * * *